March 22, 1960  S. M. BERNSTEIN ET AL  2,929,373
PORTABLE FAN-EXHAUSTED COOKING DEVICE
Filed Feb. 14, 1958  2 Sheets-Sheet 1
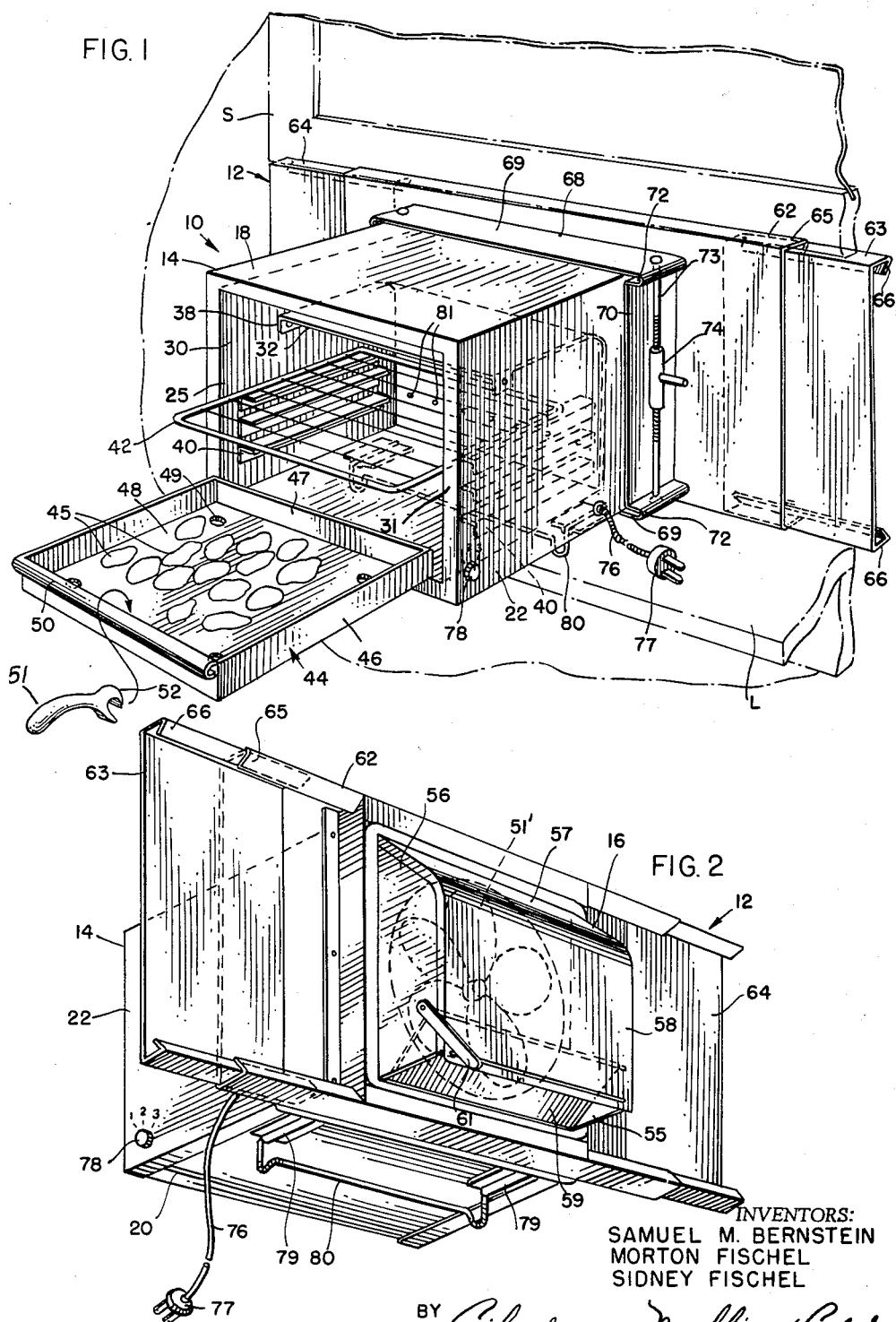
INVENTORS:
SAMUEL M. BERNSTEIN
MORTON FISCHEL
SIDNEY FISCHEL
BY Silverman, Mullin & Cass
ATT'YS March 22, 1960 S. M. BERNSTEIN ET AL 2,929,373
PORTABLE FAN-EXHAUSTED COOKING DEVICE
Filed Feb. 14, 1958 2 Sheets-Sheet 2
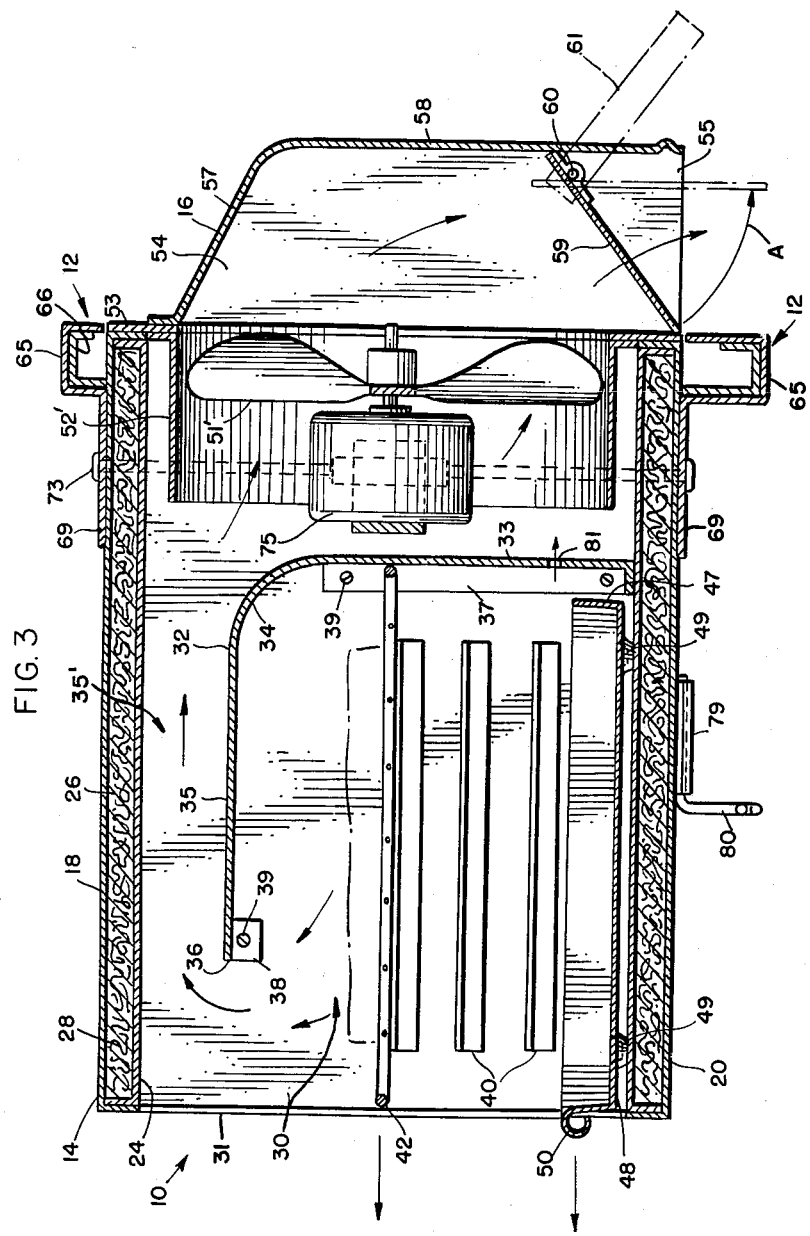
INVENTORS:
SAMUEL M. BERNSTEIN
MORTON FISCHEL
SIDNEY FISCHEL
BY Silverman, Mullin & Cass
ATT'YS – # United States Patent Office

2,929,373
Patented Mar. 22, 1960

2,929,373

PORTABLE FAN-EXHAUSTED COOKING DEVICE

Samuel M. Bernstein, Winnetka, and Morton Fischel and Sidney Fischel, Chicago, Ill., assignors to Berns Air King Corporation, Chicago, Ill.

Application February 14, 1958, Serial No. 715,269

9 Claims. (Cl. 126—25)

This invention relates to portable cooking devices and more particularly it relates to a portable, fan-exhausted charcoal broiler or barbecue device. Specifically, the invention relates to a portable unit having a cooking chamber with means for mounting the device in a window opening or the like so that the exhaust end of the device is positioned outdoors, said device having a fan for exhausting the products of combustion such as smoke, odors, fumes and the like from the cooking chamber to the outside atmosphere.

Heretofore, the use of portable charcoal broilers, barbecues, rotisseries and the like, has been well known, and in recent years their use has become increasingly wide spread. Such devices, however, are open and hence usable only outdoors. Thus, their application is confined to use only during the warm weather season or in warm climate areas.

In recent years enclosed electric broilers and rotisseries have also become popular for use indoors. However, such indoor electrical devices cannot be used for charcoal broiling, which is of course a highly preferred method for preparing foods. It is therefore apparent that there has been a long felt need for a device which will enable the preparation indoors of charcoal broiled foods.

It is therefore an important object of this invention to afford a portable charcoal broiling unit which will enable the preparation indoors of charcoal broiled foods. For this purpose the device is provided with means for exhausting the products of combustion and cooking to the outside atmosphere. Such a device comprises a charcoal broiling chamber having means for collecting and exhausting smoke, fumes, and other products of combustion and cooking to the outside atmosphere. This is accomplished by constructing the unit with an exhaust outlet at one end and with means for mounting the unit in a building opening such as a window so that the exhaust outlet is positioned outdoors. The cooking oven or chamber remains indoors. The unit is further provided with means for collecting the smoke, fumes and other products of combustion and exhausting the same through the exhaust outlet to the outside atmosphere.

Another important object of this invention is to provide a portable, fan-exhausted, cooking unit in which the exhaust means further functions to support the combustion of the charcoal fuel or the like in the cooking unit.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a portable, fan-exhausted, charcoal broiling or cooking unit embodying the principles of our invention and showing the same mounted through a window as viewed from the interior of the building;

Fig 2 is a perspective view of a modified form of the unit as viewed from the front of the same in which the panel structure is permanently secured to the housing; and Fig. 3 is a longitudinal medial sectional view taken vertically through the deivce of Fig. 1.

Referring to Fig. 1 of the drawings, reference numeral 10 indicates generally the cooking device mounted on the ledge L of a window with the window sash S abutting the top of a slidable panel 12 by means of which the unit may be mounted in the window frame.

The unit 10 may comprise a housing 14 protruding rearwardly from the window mounting panel 12 and having a discharge or exhaust housing 16 protruding forwardly of the window mounting panel. The housing 14 may be of generally rectangular shape defined by a top wall 18, a bottom wall 20 and a pair of side walls such as 22. The entire device may be of double wall construction with inner walls such as inner top wall 24 and inner side walls 25 cooperating with the outer walls 18, 20 and 22 respectively to afford an insulating space therebetween, and said space may be filled with suitable insulation material such as glass wool 28.

The housing 14 defines an inner cooking chamber 30 which opens at rear end 31 thereof but is closed intermediate the length thereof by a baffle member 32. The member 32 may be formed as a substantially L-shaped member with a forward vertical wall segment 33 arcuately curved as at 34 and having an integral horizontal segment 35 positioned and spaced below the upper inner wall 24 to define a longitudinally extending passageway 35' and terminating rearwardly as at 36 inwardly spaced from the rear end 31 of the housing. Suitable mounting means such as flanges 37 and 38, and screws such as 39, may be used to affix the member 32 to the inner side walls 25 entirely across the width of the housing. Pairs of mounting brackets such as 40 may be affixed in aligned positions to the inner walls 25 for the purpose of supporting a grill 42 in removable spaced relationship with pan 44. However, other grill supporting means may be employed, such as aligned ridges formed in the inner side walls 25. The pan 44 normally is removably positioned on the bottom of the cooking chamber 30. This pan 44 may be filled with charcoal briquettes such as 45 which of course may comprise the fuel for the cooking operation. Obviously any other suitable fuel, such as hickory wood or the like may be used.

The pan 44 may normally be formed with side and rear walls such as 46 and 47 respectively and with a bottom wall 48. The bottom wall 48 may be offset or indented at each corner as at 49 thereby affording supporting legs for the pan. The front wall of the pan may be formed with an annular flanged portion 50 designed to accommodate a removable handle 51 formed with a hook-like portion 52 at an end thereof by means of which the handle may be removably mounted on the annular flanged front wall 50 for removing the pan from the unit 10 when desired.

An exhaust fan unit 51' is mounted forwardly spaced from baffle member 32 within an annular fan mounting flange 52'. The flange 52' is affixed by any suitable means to a perforated front wall 53 of housing 14 spaced from vertical segment 33. The exhaust housing 16 also is affixed to the front surface of wall 53. Thus, there is formed an air conduit 35' between inner top wall 24 and the segment 35 through which air fumes, smoke and the like will be drawn by fan 51' from cooking chamber 30 upwardly around end 36 of segment 35 and over segment 35 in passage through said air conduit toward the front end of the device. Then, the gaseous material will pass through the passageway defined by flange 52' and through the perforated front wall 53 into the exhaust or discharge chamber 54 afforded by the housing 16. The products of combustion are then discharged out through the exhaust outlet 55 formed at the bottom of the discharge chamber housing 16 and to the outside atmosphere. The exhaust housing 16 may be defined by side walls such as 56, a top forwardly and downwardly sloping front segment 57 and a vertical front segment 58. A weight-balanced, pivoted exhaust damper such as 59 may be used to normally close the exhaust discharge passageway 55 during periods when the unit is not in operation. It will be noted in Figs. 2 and 3 of the drawings that the damper 59 is pivotally mounted as at 60 to the side walls 56 and a counterweight such as 61 is affixed thereto and so positioned as to normally maintain the damper 59 in a position to close the entrance 55. However, when the fan 51 is actuated the force of the draft will open the entrance by pivoting the damper about its pivot 60 in the direction indicated by the arrow A in Fig. 3 of the drawings. If desired other means, such as a spring may be substituted for the counter-weight 61 in maintaining the damper in normally closed position.

It will thus be seen that passageway or air conduit 35' extends longitudinally in the housing exterior of the cooking chamber 30 between the top wall of the housing and the top wall 35 of said cooking chamber. The air conduit 35' communicates at one end thereof with the rear open end of the chamber 30 with the opposite end of the air conduit opening forwardly of segment 33 in communication with the interior of annular flange 52'. Consequently, baffle segment 35 forms both the upper wall of the cooking chamber and in cooperation with upper inner wall 24 of the housing defines the air conduit 35'. The imperforate segment 35 provides means for preventing soot and grease from being discharged through the exhausting system since such debris will impinge against and be collected upon the segment 35. Since the rear end of the housing may be open, the air conduit having fan 51' associated therewith prevents the atmosphere of the cooking chamber 30 from escaping through the rear end of the housing since the draft created will draw such atmosphere preferentially into the air conduit 35' to be discharged through the front wall of the housing exterior of the building opening. Thus, the cooking chamber 30 is enclosed where required and still is provided with sufficient air supply for combustion, while means for exhausting gaseous matter are provided without interference notwithstanding the strong drafts created by the fan 51'.

As was previously indicated, for the purpose of mounting the unit in a window and closing off the area in the window which is not normally occupied or filled by the unit itself, an extendible panel structure 12 is provided. This panel structure comprises a plurality of individual panels such as 62, 63 and 64. Panels 63 and 64 are telescoped within panel 62 and retained therein by means of a bent flange formation such as 65 and 66 on the longitudinal edges thereof respectively. Flange 66 is adapted to slide within the flange 65 so that the panel may be extended or telescoped to fit any width window within the normal standards of construction.

Although the panel structure 12 may be permanently affixed in stationary position to the housing 14 it may be desirable to mount the same in movable relationship on the housing 14. When so mounted the entire panel structure may be moved longitudinally along the length of the housing 14. In this way that length of the housing 14 which it is desired to retain within the building may be varied. Conversely the length of that portion of the unit which necessarily must protrude outdoors in order for the exhaust passage 55 to clear the window ledge outside of the building, may also be thereby varied. For this purpose the panel structure 12 may be mounted on a collar such as 68 defined by top and bottom wall portions 69 and side wall portions 70. The top and bottom wall segments 69 and side wall segments 70 are integrally formed but connected by crimped portions as at 72 which protrude outwardly beyond the side wall 70. These crimped portions 72 may then be connected by means of screw-threaded tie rods such as 73 having a turnbuckle 74 positioned thereon. Rotation of the turnbuckle 74 loosens the tie rod 73 and thereby loosens the top and bottom wall 69 so that the entire collar may be moved longitudinally to any desired position. When moved to the desired position the turnbuckle 74 is again rotated to clamp the collar in tight engagement about the outer walls of the housing so that the window panel structure 12 is then locked in immovable position. It will thus be noted that with this structure the unit may be readily adapted for mounting in window openings in buildings the walls of which may vary in thickness. Of course the collar mounting structure may be varied as desired. For example, mere tightening screws may be used to clamp the collar about the housing 14.

The fan 51 may be energized by a motor 75 capable of being connected by means of a cord such as 76 and plug 77 to a suitable electrical wall receptacle power source. The speed of the fan may be regulated by means of a variable switch such as 78 mounted in readily accessible position on the side wall 22 of the oven housing 14. The switch 78 may in turn be connected to the motor 75 by suitable leads positioned between the inner and the outer walls of the chamber housing 14.

For conveniently supporting the entire housing 14, the bottom wall 20 may have a pair of suitably aligned leg mounting brackets such as 79 affixed thereto, and into these may be positioned a wire mounting leg structure 80. The mounting leg may be moved longitudinally in the brackets 79 for adjusting the leg 80 with respect to the window ledge L.

If desired, a rear lid or door (not shown in the drawings) may be hingedly mounted to close the rear open end of the cooking chamber 30.

In order to efficiently utilize the draft created by the fan 51' for the purpose of supporting combustion of the charcoal 45 a row of draft openings such as 81 may be formed in the vertical wall segment 33 of the baffle member 32. These draft openings 81 may be positioned as indicated in Fig. 3 so that air will be drawn across the fuel and thereby better support the combustion of said charcoal briquette fuels.

The entire device may be self-contained, may be provided with a carrying handle, if desired, and may be made of any suitable material such as sheet steel or the like. A rotisserie may be incorporated therein if desired.

It should also be apparent from the above description and the drawings that we have provided a simply constructed portable, fan-exhausted, charcoal broiling unit capable of affording charcoal broiling means for use indoors although the same may of course be used during warm weather outdoors. The unit is designed so that it may be mounted in a building opening such as a window and includes means for collecting and exhausting all the fumes, smoke and odors and other products of combustion to the outdoor atmosphere without any of such products of combustion or cooking escaping to the indoor atmosphere. From the foregoing it should be apparent that the charcoal broiler will have special appeal for apartment dwellers residing at higher elevation levels or who do not have yards or outdoor spaces which may be used for broiling. Likewise the broiler has a special appeal to both apartment dwellers and home owners during cold weather seasons or inclement weather periods.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What we claim and desire to secure by Letters Patent of the United States is:

1. In combination with a building exterior wall having a window opening, a portable cooking device mounted in said window opening, said cooking device comprising a housing having a perforated front wall, a bottom wall, a top wall and side walls, said housing being open at its rear end, means for removably mounting the device in said window opening with said front wall aligned with the window opening and the housing inside the building exterior wall, a fuel filled container removably positioned in said housing, a baffle wall positioned within said housing and extending upwardly from said bottom wall to define a cooking chamber, said cooking chamber having an open end in alignment with said rear end of the housing, said baffle wall and the adjacent housing walls also defining a passageway within the housing and exterior of the cooking chamber, said passageway communicating from the rear portion of said cooking chamber to said window opening through said front wall, and powered exhausting means positioned in said passageway for exhausting gases from the rear of the cooking chamber through said passageway and through said perforated front wall to the outside atmosphere, and said baffle wall substantially preventing the direct escape of gases from the front portion of said cooking chamber.

2. The cooking device of claim 1 in which said first mentioned means comprises a plurality of panels telescoped one within the other whereby the same may be extended to fill the window opening not occupied by said housing.

3. The cooking device of claim 1 in which said exhausting means includes an exhaust fan mounted in said passageway.

4. In combination with a building exterior wall having a window opening, a portable indoor charcoal broiler mounted in said window opening comprising a rectangular insulated housing having a perforated front wall, a bottom wall, a top wall and side walls, said insulated housing being open at its rear end, an exhaust housing having an exhaust outlet secured to the exterior of said front wall, means for removably installing said charcoal broiler in said window opening with said front wall aligned with the window opening and the insulated housing inside of the building exterior wall, a charcoal filled container removably positioned on said bottom wall, a baffle wall positioned within said insulated housing and extending upwardly from said bottom wall to define a cooking chamber, said cooking chamber having an open end in alignment with said rear end of the insulated housing, said baffle wall also defining an exhaust passageway within the insulated housing exterior of the cooking chamber, said exhaust passageway extending from the rear portion of said cooking chamber through the perforated front wall to said exhaust housing, and power driven exhaust means mounted in said exhaust passageway for exhausting the volatile and gaseous products of combustion from the rear of the cooking chamber through the perforated front wall to the atmosphere, said baffle wall also blocking direct passage of said products of combustion from the front portion of said cooking chamber.

5. The charcoal broiler of claim 4 in which said baffle wall comprises a sheet of metal having a vertical segment and a horizontal segment integrally connected by an arcuate segment, said baffle wall being mounted in said housing with the vertical segment positioned in spaced relationship with said power driven means so that said vertical segment closes the inner end of said cooking chamber and said horizontal segment is positioned in spaced relationship with said top wall so that said horizontal segment serves as a partial top closure for said cooking chamber, the free end of said horizontal segment terminating inwardly spaced from said rear end of said housing.

6. The charcoal broiler of claim 4 in which said power driven means comprises a motor driven exhaust fan, there is an annular fan mounting flange positioned between said baffle wall and the front wall, and said fan is positioned in said mounting flange.

7. The charcoal broiler of claim 4 in which said first mentioned means comprises a plurality of panels telescopically arranged whereby said panels may be laterally extended to close off that area in the window opening not occupied by the broiler itself.

8. The charcoal broiler of claim 7 in which said panels are mounted on a rectangular sleeve, said sleeve being positioned to slidably encircle said insulated housing whereby said panels may be moved longitudinally along said insulated housing and means for clamping said sleeve in immovable relationship on said insulated housing.

9. A portable indoor cooking appliance comprising, a box-like insulated cabinet having a front wall provided with an opening therethrough, an open rear end, a top, bottom and side walls, an exhaust housing secured to the outer side of said front wall and communicating with the interior of the cabinet through said opening in said front wall, said exhaust housing having an outlet and a pivotally mounted damper positioned to normally close said outlet, a substantially L-shaped baffle member secured within said cabinet to form a cooking chamber in which the upper and front end walls respectively of said chamber are provided by said baffle member and the bottom and side walls of said chamber are provided by the bottom and side walls of said cabinet respectively, said cooking chamber having an open end aligned with and inwardly displaced from said rear end of said cabinet, said upper wall of said cooking chamber being spaced from the top wall of said cabinet and said front end wall of said cooking chamber being inwardly spaced from the front wall of said cabinet, bracket means on the inner surfaces of said cabinet side walls for adjustably mounting a grill in said cooking chamber in spaced relationship above the bottom wall of said cabinet, said baffle member defining an air conduit between said upper wall of said cooking chamber and the top wall of said cabinet, said air conduit communicating between the front wall of said cabinet and said open end of said cooking chamber, an annular fan mounting flange positioned in said air conduit between the front wall of said cabinet and said front end wall of said cooking chamber, a motor driven exhaust fan mounted in said mounting flange, means attached exterior of said cabinet for mounting said appliance in a window opening of an exterior building wall, a rectangular sleeve encircling said cabinet secured to said appliance mounting means, said cabinet slidable longitudinally within said sleeve for adjusting the position thereof with respect to said appliance mounting means, means for clamping opposed sides of said sleeve in immovable relationship on said cabinet, and a charcoal filled container removably positioned in said cooking chamber.

References Cited in the file of this patent

UNITED STATES PATENTS

| | | | |
|---|---|---|---|
| 53,503 | Talpey | Mar. 27, | 1866 |
| 209,332 | Darling | Oct. 29, | 1878 |
| 709,876 | Cooke | Sept. 30, | 1902 |
| 803,938 | Thompson | Nov. 7, | 1905 |
| 935,021 | Hatcher | Sept. 28, | 1909 |
| 964,913 | Hensley | July 19, | 1910 |
| 1,228,023 | Huyette | May 29, | 1917 |
| 1,328,183 | Mlekush | Jan. 13, | 1920 |
| 1,492,582 | Smith | May 6, | 1924 |
| 1,698,328 | Duffie | Jan. 8, | 1929 |
| 1,943,585 | Cummins, et al. | Jan. 16, | 1934 |
| 2,008,965 | Miller | July 23, | 1935 |
| 2,044,388 | Gundelfinger | June 16, | 1936 |
| 2,077,496 | Sonntag | Apr. 20, | 1937 |
| 2,211,940 | Stoner | Aug. 20, | 1940 |
| 2,262,273 | Ferrara | Nov. 11, | 1941 |
| 2,281,015 | Weise | Apr. 28, | 1942 |
| 2,307,914 | Bitney | Jan. 12, | 1943 |
| 2,490,076 | Maxson | Dec. 6, | 1949 |
| 2,592,174 | O'Connell | Apr. 8, | 1952 |
| 2,851,941 | Cogar | Sept. 16, | 1958 |

FOREIGN PATENTS

| | | |
|---|---|---|
| 2,554 | Great Britain | 1893 |